United States Patent [19]

Mineart

[11] Patent Number: 4,838,623
[45] Date of Patent: Jun. 13, 1989

[54] CONNECTOR WITH SPRING RETENTION DEVICE

[75] Inventor: Michael V. Mineart, Livermore, Calif.

[73] Assignee: FMC Corporation, Chicago, Ill.

[21] Appl. No.: 100,645

[22] Filed: Sep. 24, 1987

[51] Int. Cl.$^4$ ............................................. B62D 55/20
[52] U.S. Cl. .................. 305/58 PC; 305/59; 403/354; 474/223
[58] Field of Search .............. 305/58 PC, 58 R, 59; 474/222, 223, 224, 225, 226, 227, 228, 229; 403/354, 355

[56] References Cited

U.S. PATENT DOCUMENTS

| | | | |
|---|---|---|---|
| 2,398,107 | 4/1946 | Morrow | 474/222 |
| 2,612,056 | 9/1952 | Prox, Jr. et al. | 474/223 |
| 2,831,716 | 4/1958 | Wurzer | 403/335 |
| 3,362,759 | 1/1968 | Ley | 305/59 |
| 3,597,019 | 8/1971 | Korner | 305/54 |
| 4,136,913 | 1/1979 | Pietzsch et al. | 305/58 |
| 4,141,599 | 2/1979 | Stolz | 305/35 |
| 4,198,814 | 4/1980 | Schoenick | 474/227 X |
| 4,583,792 | 4/1986 | Erlenmaier et al. | 305/42 |

FOREIGN PATENT DOCUMENTS 1280075 10/1968 Fed. Rep. of Germany ... 305/58 AC

*Primary Examiner*—Andres Kashnikow
*Assistant Examiner*—Matthew C. Graham
*Attorney, Agent, or Firm*—A. J. Moore; H. M. Stanley; R. B. Megley

[57] ABSTRACT

An end connector for double-pin track shoes or the like receives a pair of pins having arcuate grooves therein. The connector includes pin receiving openings having small diameter pin engaging arcuate surfaces, and large diameter arcuate grooves therebetween which nest arcuate portions of a spring therein. The spring also includes resiliently stressed portions that snap into the arcuate grooves in the pins when assembled, and a cap screw operatively connected between two walls of the connector clamps the connector onto the pins, thus providing double protection for maintaining the connector on the pins.

2 Claims, 1 Drawing Sheet

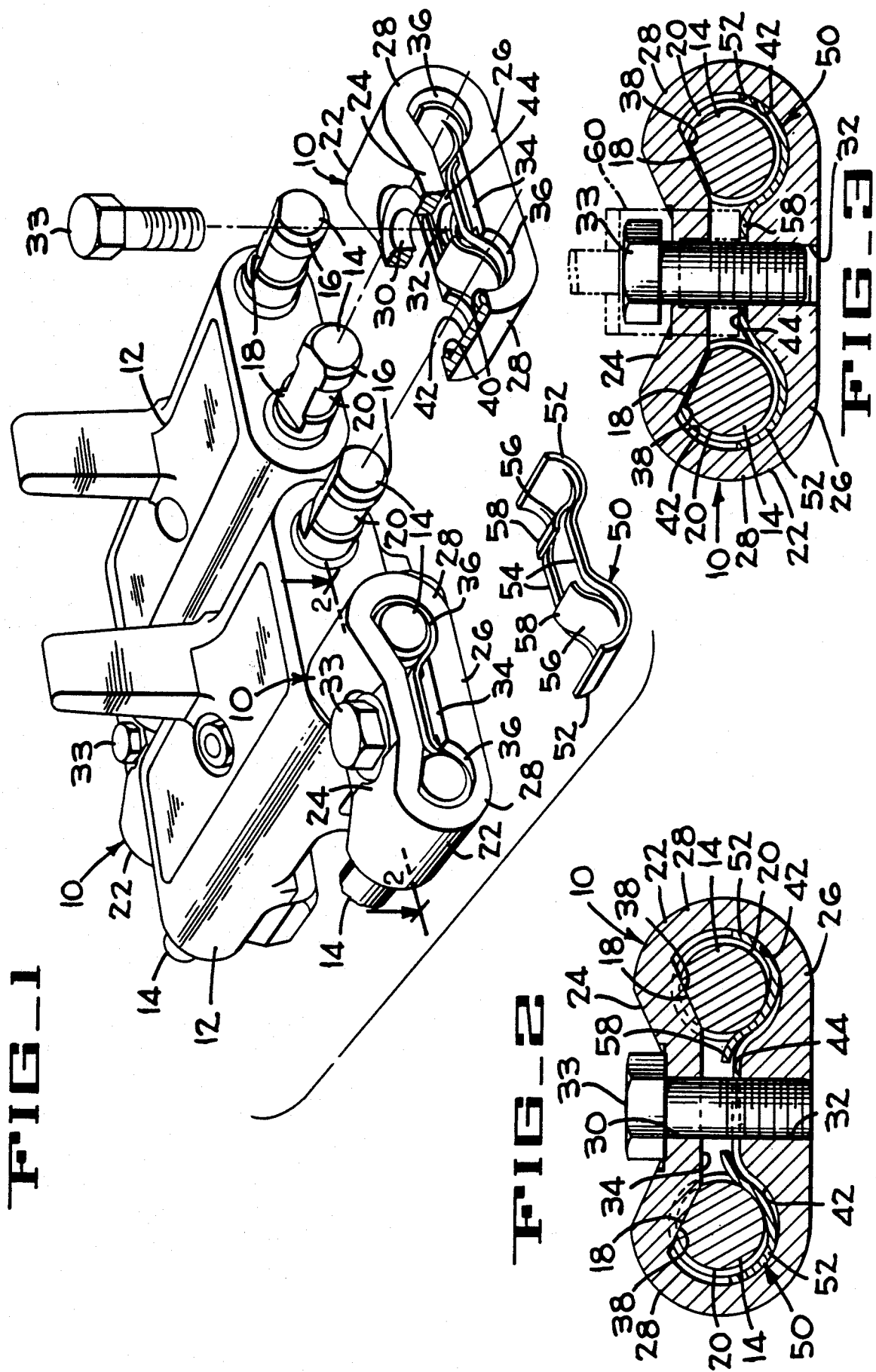

CONNECTOR WITH SPRING RETENTION DEVICE

BACKGROUND OF THE INVENTION

1. Field of the Invention

The present invention relates to connectors and more specifically to connectors with spring retention devices for use with double-pin track shoes.

2. Description of the Prior Art

Double-pin track shoe connectors are well known in the art such as disclosed in U.S. Pat. No. 3,597,019; Korner Pietzsch et al U.S. Pat. No. 4,136,913; Stolz U.S. Pat. No. 4,141,599 and Erlenmair et al U.S. Pat No. 4,583,792.

Typically a double-pin track shoe assembly includes a track shoe body, a pair of track shoe pins extending through and projecting out of the opposite ends of the body, and two end connectors which are clamped on opposite ends of adjacent pins in adjacent track shoes. The end connectors are generally patterned after two types of configurations, a clamp type as shown in Korner U.S. Pat. No. 3,597,019 and Pietzsch et al, U.S. Pat No. 4,136,913 which uses only cap screws and bolts, respectively, for applying the clamping force; and a wedge type as shown in Stolz U.S. Pat. No. 4,141,599. In these prior art devices a single fastener such as a cap screw or bolt is the only means by which the end connector is secured to the pins. Loosening of the single connector leads to a loss of clamping force between the connector and the pins which may cause loss of the connector causing track separation. This may cause loss of vehicle control and possible injury to the vehicle, the vehicle's crew, and other people or property in the vicinity of the vehicle.

SUMMARY OF THE INVENTION

In accordance with the present invention, end connector retention is assured, even in the event the clamping bolt or cap screw loosens or is completely lost. A retention spring is fitted in a groove formed in a portion of each end connector and has a resilient portion which snaps into mating grooves in the track pins when the connector is slid over the pins into operative position. Fastener means such as a cap screw is then tightened to firmly clamp the connector to the pins. If the cap screw loosens or falls out, the retention spring prevents the connector from sliding off the pins, but may be intentionally released by a spring depressing tool such as a screw driver.

BRIEF DESCRIPTION OF THE DRAWINGS

FIG. 1 is an exploded perspective of a pair of track shoes and a pair of end connectors and locking springs of the present invention.

FIG. 2 is a section taken along lines 2—2 of FIG. 1 illustrating the connector and locking spring in clamping position on a pair of track shoe pins.

FIG. 3 is a section similar to FIG. 2 but illustrates the connector in an unclamped position with a double pronged spring depressing tool shown in phantom.

DESCRIPTION OF THE PREFERRED EMBODIMENT

The end connector 10 (FIGS. 1-3) of the present invention is specifically intended for connecting double-pin track shoes 12 of a track laying vehicle together, although it will be understood that the connector 10 may be used in other environments. As used herein and in the claims, it will be understood that the term pin includes rods, shafts, and other similar members desired to be connected together.

Each track shoe is provided with two connecting pins 14 which project out both ends of the shoe. The end portion of each pin 14 is chamfered at 16 and includes a connector engaging locking surface 18 illustrated as a flat surface, and an arcuate groove 20. Each end connector 10 includes a body 22 having an upper or first wall 24 (as viewed in FIGS. 1-3), a lower or second wall 26, and arcuate end walls 28. Openings 30 and 32 in the upper and lower walls are provided to receive a fastener 33 which is illustrated as a cap screw that is screwed into the threaded hole 32. A slot 34 communicates with a pair of pin receiving openings 36 that are formed in the body 22. Each pin receiving opening 36 is provided with a flat clamping surface 38, a pair of small diameter arcuate surfaces 40 (FIG. 1), a spring receiving large diameter arcuate surface 42, and a shallow channel 44 in the lower wall 26.

An elongated resilient retention spring 50 includes arcuate end portions 52 interconnected by narrow connecting members 54 which with the intermediate portion of the elongated spring defines an opening for accommodating the fastener 33. Inner resiliently stressed clamping sections 56 of the retention spring are partially severed from the arcuate end portion 52 and are bent to a smaller radius with a reverse bend 58 on the inner ends thereof. In order to mount the retention spring 50 within the slots 42 and 44 in the connector body 22, the length of the spring is foreshortened by bending, thus allowing the spring to be pushed past the small diameter arcuate surfaces 40 for acceptance within the large diameter arcuate surfaces 42 and the channel 44. The fastener 33 is initially loosely screwed into the connector 10 thereby maintaining the body 22, the fastener 33, and the spring 50 together as a unit. It will be noted that the width of the retention spring 50, including the large diameter arcuate surfaces 42, and the width of the arcuate grooves 20 in the pins 14 are at least two-thirds of the width of the end connectors 10.

In order to assembly the end connector 10 onto a pair of connecting pins 14, the connector unit is first aligned with the pins and is pushed transversely onto the pins. The chamfered edges 16 of the pins cam the resiliently stressed inner clamping sections 56 downwardly into the position shown in FIG. 3, and further movement of the connector 10 onto the pins allows the clamping sections to resiliently snap into the small diameter groove 20 (FIG. 1) of the pin 14, thereby defining the first connector lock which prevents further axial movement of the connector relative to the pins 14. The fastener 33 (FIG. 3) is then tightened thereby clamping the surfaces 18, 38 firmly together as shown in FIG. 2, thus defining a second connector lock which locks the end connector 10 to the connecting pins 14 of the track shoe 12.

In the event the fastener 33 loosens or falls out of the connector 10, contact between the clamping sections 56 of the spring and the groove edges of the small diameter surfaces 28 of the pins will maintain the connector 10 on the pins.

When it is desired to remove a connector 10 from a pair of pins 14, the fastener 33 is loosened allowing the upper wall 24 to resiliently move upwardly to the position shown in FIG. 3 at which time a clamping force is released between the pins 14 and the connector 10. A suitable tool such as a screw driver, or a double pronged screw driver 60 as illustrated in phantom lines in FIG. 3, is used to pry the clamping sections 56 of the spring 50 downwardly as illustrated in FIG. 3 thereby allowing the connector to be easily removed from the pins 14.

From the foregoing description it is apparent that the connector with spring retaining device of the present invention provides double protection for maintaining the connector on a pair of pins of an endless track or the like.

Although the best mode contemplated for carrying out the present invention has been herein shown and described, it will be apparent that modification and variation may be made without departing from what is regarded to be the subject matter of the invention.

What is claimed is:

1. A track shoe end connector comprising:

means defining a body having a first wall spaced from a second wall and integrally connected together by end walls with said first and second walls having aligned fastener openings therein;

means defining end openings in said end walls including arcuate portions for accommodating end portions of connector pins;

means defining an arcuate slot within each end opening means and having a radius larger than that of said associated end opening means;

resilient locking means formed from flat spring material having a fastener opening therein and including interconnected resilient arcuate sections received within said arcuate slots and further having resilient arcuate locking portions stressed to move radially inward of said arcuate slots when in locking position; and fastener means removably received in said fastener openings in said first wall, said second wall, and said resilient locking means for maintaining said locking means within said body, said resilient locking means being resiliently retained within said body when said fastener means is removed from said body.

2. A track shoe connector for locking two spaced parallel pins having arcuate grooves therein together, comprising:

Means defining a connector body having a first wall spaced from a second wall and integrally connected together by end walls, said first and second walls having connector openings therein;

means defining a pin receiving opening in each end wall shaped to slidably accept the pins in response to transverse movement between said body and said pins and to prevent rotation of said pins relative to said body;

means defining an elongated spring receiving channel in said second wall communicating with arcuate spring receiving slots in said end portions of said end walls; and means defining an elongated spring formed from flat spring material having a central opening therein and fitted in said channel and slots and normally held from transverse movement out of said channel, said spring means including end portions conforming to a portion of the shape of said arcuate slots and having spaced resiliently stressed clamping sections which are resiliently urged into the arcuate grooves in said pins and are adapted to engage side walls of said slots in said connector body for locking said pins from transverse movement relative to said connector body; and fastener means removably received in said connector openings in said connector body walls and in said central opening in said elongated spring means, said spring means locking said connector body to said spaced pins when said fastener means is dislodged from said connector body for precluding unintentional separation of said end connector from said connector pins.

* * * * *